73-660

XR  3,705,516

United States
Reis

[15] 3,705,516
[45] Dec. 12, 1972

[54] METHOD AND APPARATUS FOR TESTING THE CONDITION OF A MACHINE

[72] Inventor: James John Reis, Torrance, Calif.

[73] Assignee: Northrop Corporation, Los Angeles, Calif.

[22] Filed: Sept. 30, 1971

[21] Appl. No.: 185,193

[52] U.S. Cl. .................................................73/71.4
[51] Int. Cl. ........................G01h 1/04, G01m 13/02
[58] Field of Search......73/71.4, 71.2, 71.3, 67, 67.2, 73/69

[56] References Cited

UNITED STATES PATENTS 3,029,385  4/1962  Steinbrenner et al. ............73/67.2 X
2,361,990  11/1944  Brown......................................73/67

Primary Examiner—James J. Gill
Attorney—W. M. Graham et al.

[57] ABSTRACT

The vibrational components over a frequency spectrum of interest developed by a machine are transformed into electrical signals by means of a transducer such as an accelerometer, and these electrical signals in turn are processed by means of a spectrum analyzer to provide a power spectral density plot thereof. The peak amplitude of the signals in a pair of preselected frequency bands is then detected and the ratio between these two signals determined. This ratio is then compared against a value representing an acceptable ratio experimentally or theoretically derived to determine whether the measured ratio is within acceptable tolerances for the machine. The bands utilized are preferably a first band within a high frequency vibrational range, and a second band lower in frequency than this first band with the signals in these bands being of medium amplitude relative to all of the signals developed in the spectral analysis.

11 Claims, 3 Drawing Figures

METHOD AND APPARATUS FOR TESTING THE CONDITION OF A MACHINE

This invention relates to the testing of the operating condition of machines, and more particularly to such testing in which the vibrational outputs of the machine are measured in determining such condition.

In maintaining machinery utilizing moving parts in proper operating condition, it has been found that the vibrational energy developed by the machine over a frequency spectrum can provide an indication of the incipient failure of machine components. The accurate determination of any such incipient failures is particularly important when dealing with machinery utilized in aircraft, such as aircraft engines, gear boxes and transmission systems, where the failure of such equipment could present a serious safety hazard.

Prior art techniques for measuring the condition of machinery utilize a vibration analysis in which a power spectral density plot of the machine's emitted vibrations is made and a plot for a machine under test compared with a standard or reference plot which represents that of a properly functioning machine, for discrepancies between the two. It has been found to be quite difficult to accurately pinpoint the source and nature of incipient failures with this technique for several reasons. First, this technique requires a close calibration of the measuring instruments and readout system utilized in view of the fact that the amplitude of the vibrational output is used as a criterion of proper operation. The amplitude levels of the vibratory components vary significantly with the loading of the machine, so that for the output readings to have any meaning, such loadings must be accurately controlled. Further, it is necessary to accurately identify the origin of the various frequency components in order to make a proper analysis. This is difficult to do especially in view of the fact that the frequencies and amplitudes of vibrational components generated are a function of the machine speed and power setting. This means that in order to obtain useful information, a speed tracking device must be utilized in the machine to servo such operation so as to normalize the spectrum of the vibrational output thereof to enable proper evaluation. Further, with the techniques of the prior art, the criteria used to determine whether the machine is functioning properly are usually rather involved, which somewhat complicates the evaluation.

The method and apparatus of this invention provides a simple, straightforward yet highly accurate technique for measuring the condition of a machine, not dependent on the various factors set forth above, which as noted above complicate the measurements. Firstly, with the technique of this invention, in view of the fact that the *ratio* between selected vibrational components in the output is utilized rather than their absolute amplitude, such amplitude measurements no longer are critical. Further, the loading of the machine and the necessity for tracking small speed changes are obviated, again because of the fact that the *ratio* rather than absolute values is utilized in the analysis, and as the maximum amplitude of the signals over a band of frequencies is utilized in making the ratio measurements, some frequency shift in the output signals is not critical to such measurements. Still further, in view of the fact that the ratio between two signals present in the output is utilized rather than absolute measurements, the calibration of the detection and measuring equipment is not at all critical, which greatly facilitates its utilization and reliability of operation.

It is therefore an object of this invention to provide an improved method and apparatus for determining the operating condition of a machine.

It is a further object of this invention to provide a technique and apparatus for measuring the operating condition of a machine which is simpler to utilize and more reliable than that of the prior art.

It is still another object of this invention to provide a technique and apparatus for determining the condition of a machine by measuring the ratio of predetermined portions of the vibrational output thereof, which is more accurate than the prior art.

Other objects of this invention will become apparent as the description proceeds in connection with the accompanying drawings, of which:

Figure 1:
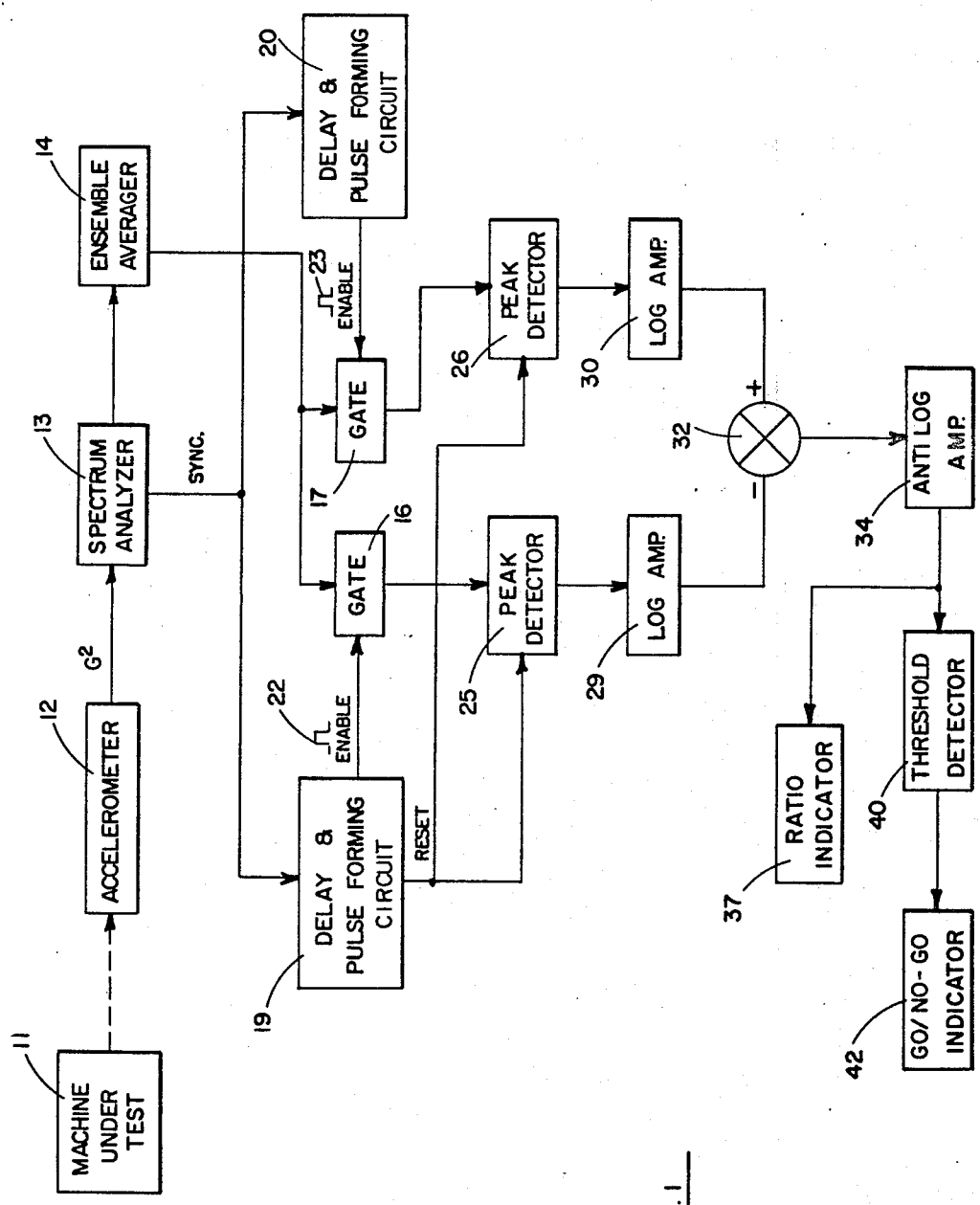
FIG. 1 is a block diagram illustrating one embodiment of the apparatus of the invention.

In summary, the invention is as follows: A transducer which preferably may be an accelerometer for measuring the second derivative of the displacement vibrational components generated by the machine, is used to develop an electrical signal in accordance with such vibrational output. The output of the transducer is fed to a spectrum analyzer or the like, which provides an output representing the amplitudes of the various frequency components that make up the vibration signal over a predetermined frequency spectrum as a function of a time base. That is to say, a scan is provided of the spectral components. The signals in two separate preselected frequency bands are separated out from the output of the spectrum analyzer. These two bands are selected based on the criteria that they both contain signals which are all within a medium amplitude range, and one of the bands is in a high frequency range of the spectrum of interest while the other is in a lower frequency range than the first. Signals in accordance with the peak signal in each band are then generated. The ratio between these two peak signals is measured and this ratio compared with a reference ratio which represents a standard or properly functioning machine. Whether or not the operation of the machine is acceptable is determined against this standard in accordance with the tolerance limits established. An automatic "GO/NO-GO" indicator may be used in making this determination with the tolerance limits being measured by a threshold detector, or the ratio may be directly read out on an indicator by an operator who himself makes the evaluation judgment.

Let us now discuss the various criteria utilized in the technique of the invention for establishing the basis of the machine condition evaluation. Firstly, the signal components of the frequency bands utilized in making the ratio measurements must all be of medium amplitude, these conditions being established with reference to the spectral density plot for the standard or reference (properly operating) machine. Medium amplitude may be defined as between 0.1 percent and 10 percent of the peak amplitude for the entire power spectral density plot. Secondly, one of the frequency bands should be at the high frequency end of the power spectral density plot, and the other band must be lower in frequency than the first band, but in any event above the fundamental vibration frequency of the machine. Each individual machine, of course, will have a somewhat different power spectral density plot, and thus the frequency bands in question may in some instances be relatively close to each other and in others spread quite far apart. The reason why the medium amplitude components are utilized is because these components, it has been found, contain the intermodulation products of vibration which generally or readily convey failure information as distinguished from the high amplitude components which generally represent a fundamental vibration component of the machine and the harmonics thereof which do not change even as components start to fail.

The acceleration or second derivative of the vibratory displacement is utilized in making the measurement in view of the fact that it provides a higher amplitude signal, especially at the higher frequency in view of the fact that, for a given displacement, the corresponding amplitude of the acceleration components increases with the square of the angular velocity. The use of the second derivative of vibration, i.e., acceleration, is also significant in providing a higher sensitivity of ratio measurement in view of the fact that for a given vibrational displacement, the higher frequency components will tend to have a higher acceleration than the lower frequency components because, as already noted, the acceleration is a function of the square of frequency.

Figure 2:
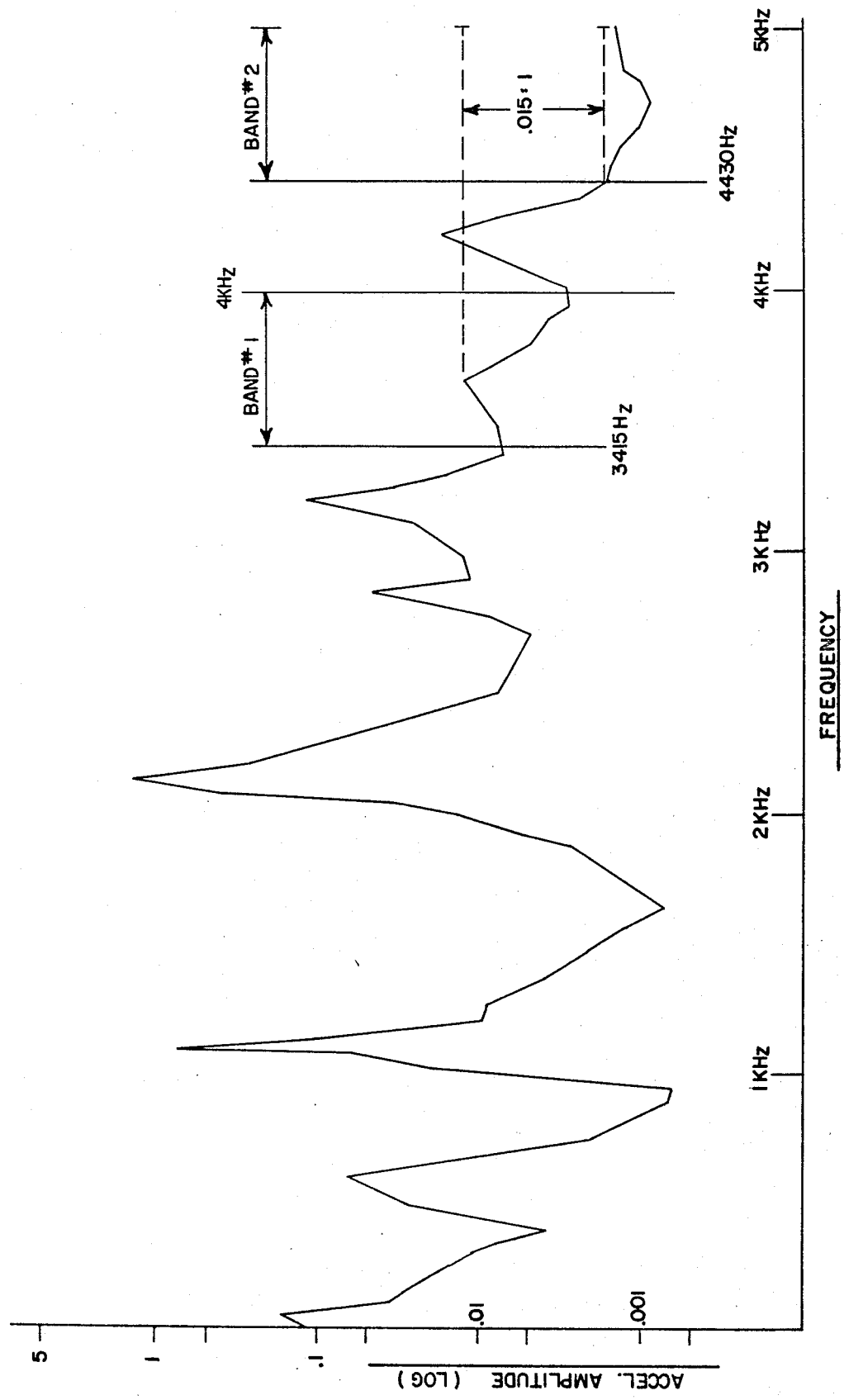
FIG. 2 is an illustrative power spectral density plot of a properly functioning machine which could be used as a standard for practicing the technique of the invention.
Figure 3:
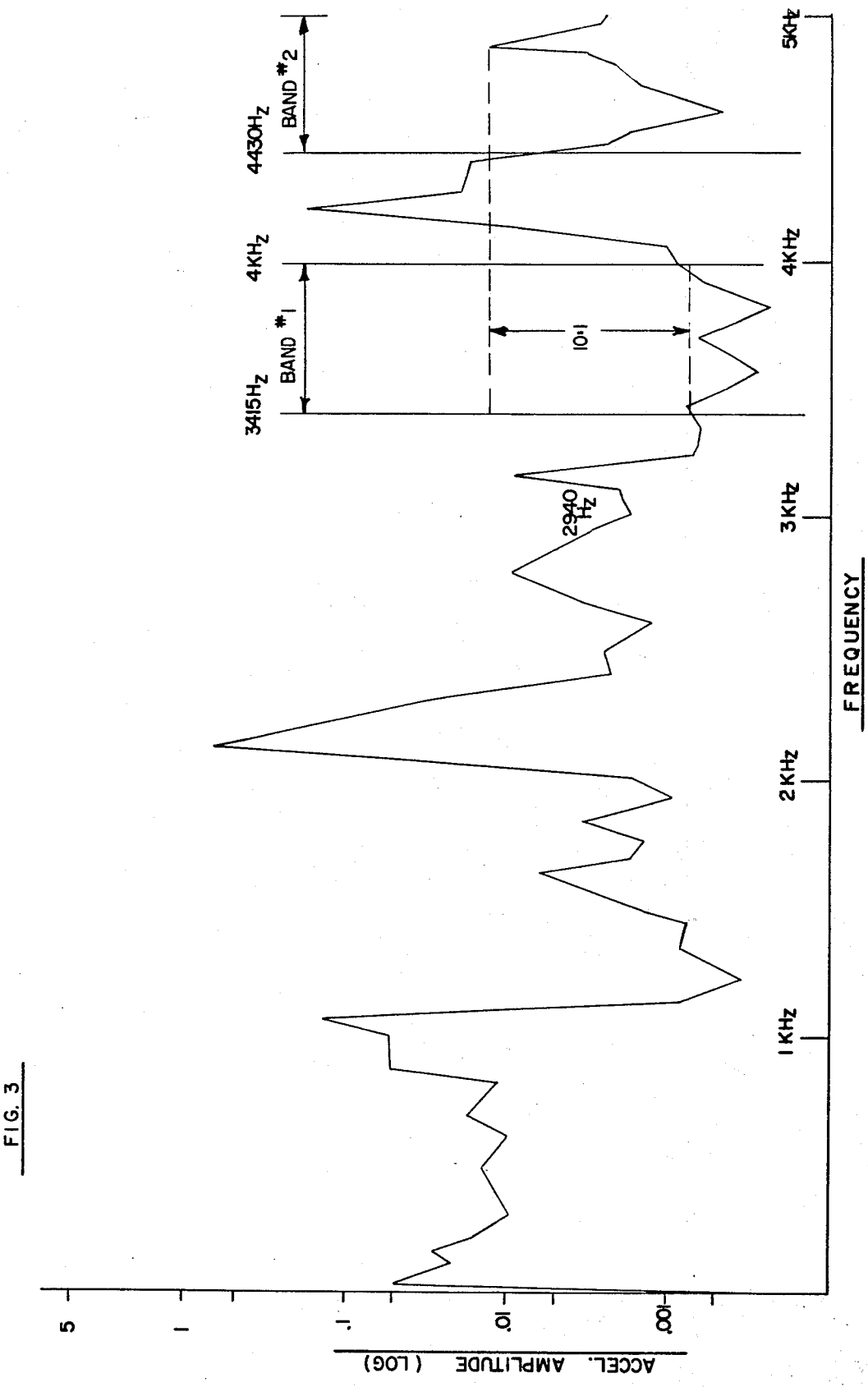
FIG. 3 is an illustrative power spectral density plot of the same model machine as that of FIG. 2 but which has a condition therein indicating incipient malfunctioning.

Referring now to FIGS. 2 and 3, spectral density plots for a particular gear box, one of which is in good condition and the other of which has a condition indicating incipient failure, are respectively shown. In both of these Figures, the output of an accelerometer attached to the machine is shown as plotted against frequency. As to be explained further on in the specification in connection with FIG. 1 such an output signal can be developed with a spectrum analyzer which provides a signal in accordance with the amplitude of these frequency components against a time base. The band designated "Band No. 2" is a high frequency band of interest, while the band designated "Band No. 1" is a lower frequency band of interest between which bands the ratio measurements are to be made. As to be noted, the peak amplitudes of the components in these bands lie between 0.1 percent and 10 percent of the peak output of the entire plot. As indicated in FIG. 2, the ratio between the peak of the components of Band No. 2 and the peak of the components of Band No. 1 is 0.015:1. This is a ratio indicative of a gear box operating in optimum condition. Referring to FIG. 3, which illustrates the measurement made for the same type of gear box but one which has bad output roller bearings, it can be seen that the ratio between the peak output in Band 2 to the peak output in Band 1 is now 10:1. Thus, it can be seen that a significant increase in the ratio between the peak of Band 2 to the peak of Band 1 indicates an incipient malfunction. It is to be noted that the plots of FIGS. 2 and 3 represent actual measurements made for gear boxes in which malfunction conditions were actually verified.

It is to be noted that in all cases an increase in the ratio between the peak signal in the high frequency band to that of the lower frequency band is indicative of a deterioration in condition. Tolerances to establish acceptable limits of deterioration can of course be established in any particular instance, so that as now to be explained in connection with FIG. 1, "GO/NO-GO" criteria can be established and parts then tested to determine whether they fall within the established tolerances. It is further to be noted that the spectral density plot for an ideal machine, as shown in FIG. 2, can either be established empirically with an actual part or can be theoretically calculated.

Referring now to FIG. 1, apparatus for implementing the technique of the invention is schematically illustrated. An accelerometer 12 is mechanically coupled to a machine under test 11, so as to receive the vibrational output thereof. Accelerometer 12 transforms the mechanical vibrational components of the machine into an electrical signal in accordance with the second derivative of the displacement of the vibration to spectrum analyzer 13. Spectrum analyzer 13, which may be any of several units commercially available such as the Model SD301B Spectrum Analyzer manufactured by Spectral-Dynamics Company, San Diego, California, provides in conjunction with ensemble averager 14 a power spectral density plot of the vibration signal such as shown in FIGS. 2 and 3, i.e., the analyzer produces an output which provides the amplitude squared of the frequency components of the output of the accelerometer against a time base. The output of spectrum analyzer 13 is fed to an ensemble averager 14 which provides an averaging of the signal components, this equipment also being an off-the-shelf item such as Model SD302B of the aforementioned Spectral Dynamics Company. The output of ensemble averager 14, which as already noted is a signal of the general type illustrated in FIGS. 2 and 3, is fed to both gates 16 and 17. A sync signal which is synchronized with the start of the scanning cycle of the spectrum analyzer is fed to delay and pulse forming circuits 19 and 20.

Delay and pulse forming circuit 19 delays the sync signal received from the spectrum analyzer an amount equivalent to the time from the beginning of the scan at which one of the frequency bands of interest appears (e.g., Band 1 of FIG. 2). Circuit 19 also includes a pulse forming circuit which in response to the delayed sync signal generates a gating pulse corresponding to the width of this frequency band. Similarly delay and pulse forming circuit 20 provides a gating signal delayed so that it appears with the arrival of the higher frequency band (Band No. 2 in FIG. 2), and having a width in accordance with the width of this higher frequency band. Delay and pulse forming circuits 19 and 20 provide enabling pulses 22 and 23 to gates 16 and 17 respectively, to enable the gating of the signals in the lower and higher frequency bands of interest to peak detectors 25 and 26 respectively.

Peak detectors 25 and 26 provide outputs in accordance with the peak amplitude of the signals received thereby. These signals are fed to logarithmic amplifiers 29 and 30 respectively. Logarithmic amplifiers 29 and 30 provide outputs in accordance with the logarithm of the input signals fed thereto, as is well known in the art. The outputs of logarithmic amplifiers 29 and 30 are fed to summing device 32, the output of amplifier 29 being fed to the summing device as a negative quantity so that the summing device provides the difference between the two signals fed thereto. The output of summing device 32 is fed to anti-log amplifier 34, which converts the signal back to its linear equivalent. Thus, as can be seen, with the subtraction of the logarithmic quantities a division of their linear equivalents is performed so as to obtain a ratio between the two signals. Anti-log amplifier 34 converts the signal log difference back to its linear equivalent.

The output of amplifier 34 is fed to ratio indicator 37 which may be a conventional voltmeter properly calibrated and scaled to directly indicate the signal ratio. The output of anti-log amplifier 34 is also fed to a threshold detector 40, which is appropriately calibrated to reflect tolerances established for the ratio measurement. The threshold detector may be biased, for example, so that when the voltage input thereto represents a ratio in excess of 5:1 (or any other selected ratio), its circuit will be actuated to provide an appropriate "NO-GO" signal to "GO/NO-GO" indicator 42. GO/NO-GO indicator 42, which may comprise an indicator lamp or a buzzer, is actuated to provide a "NO-GO" indication of the type in question whenever threshold detector 40 is actuated by a signal indicating an out-of-tolerance condition. This, of course, is only one of many specific implementations that may be utilized to automatically indicate out-of-tolerance operation. Other alternative devices include meter indicators which are red lined to indicate the tolerance limit, oscilloscope indicators, etc.

The technique and apparatus of this invention thus provides a simple yet highly accurate and effective means for indicating the condition of a piece of machinery without relying on complicated calibration and evaluation procedures. This technique is readily adapted to making automatic GO/NO-GO checks to determine whether the machinery has fallen outside of acceptable tolerance limits.

While the technique and apparatus of this invention has been described and illustrated in detail, it is to be clearly understood that this is intended by way of illustration and example only and is not to be taken by way of limitation, the spirit and scope of this invention being limited only by the terms of the following claims.

I claim:

1. A method for evaluating the condition of a machine having moving parts therein comprising the steps of:
   setting the machine in operation,
   generating an electrical output in accordance with the vibrational signals developed in the machine,
   converting said vibrational output to the form of a power spectral density plot wherein the frequency components thereof appear against a time base,
   generating signals in accordance with the peak amplitude of the signals in a first predetermined high frequency band of the signal components,
   generating a second signal in accordance with the peak amplitude of the signals in a second predetermined band lower in frequency than said first band, and
   measuring the ratio of the amplitudes of the two peak signals, said ratio being indicative of the condition of the machine.

2. The method of claim 1 wherein an electrical signal is generated in accordance with the acceleration of the vibrational components developed in the machine.

3. The method of claim 1 and additionally including the step of comparing the ratio with a reference level and generating a "NO-GO" signal when the measured ratio exceeds said reference level.

4. The method of claim 1 wherein the peak amplitude of the signals in said predetermined frequency bands are between 0.1 percent and 10 percent of the peak signal in the entire spectral density plot.

5. The method of claim 1 wherein the vibrational components in both of said predetermined frequency bands represent intermodulation components of the vibration developed in the machine.

6. The method of claim 1 wherein the steps set forth therein are first utilized to determine a reference ratio which is used as a standard ratio which is compared with subsequent measurements in accordance with the steps set forth therein.

7. Apparatus for testing the condition of a machine comprising:
   means for generating an electrical signal in accordance with the vibrational output of said machine,
   spectrum analyzer means responsive to said vibrational output for converting said output to the form of a spectral density plot,
   first and second gating means for receiving the output of said spectrum analyzer means,
   means synchronized with the scan of said spectrum analyzer means for gating the signals in a first frequency band through said first gating means,
   means synchronized with the scan of said spectrum analyzer means for gating the signals in a second frequency band lower in frequency than said first band through said second gating means,
   first and second peak detector means for receiving the outputs of said first and second gating means respectively and providing outputs in accordance with the peak amplitudes thereof, and
   means for generating a signal in accordance with the ratio between the outputs of said peak detectors.

8. The apparatus of claim 7 and further including threshold detector means for receiving the ratio signal and generating an output when said ratio exceeds a predetermined value and indicator means for producing an indicating signal in response to the output of the threshold detector means.

9. The apparatus of claim 7 wherein said means for generating an electrical signal in accordance with vibrational output comprises an accelerometer.

10. The apparatus of claim 7 wherein said means for gating said signals through said gating means comprises delay and pulse forming circuits.

11. The apparatus of claim 7 wherein said means for generating a signal in accordance with the ratio comprises logarithmic amplifiers for logarithmically amplifying the outputs of said peak detectors, summing means for generating a signal in accordance with the difference of the outputs of said logarithmic amplifiers, and an anti-logarithmic amplifier for converting the output of said summing means to its linear equivalent.

* * * * *